(12) United States Patent
Hasselqvist et al.

(10) Patent No.: US 11,414,727 B2
(45) Date of Patent: Aug. 16, 2022

(54) SUPERALLOY WITHOUT TITANIUM, POWDER, METHOD AND COMPONENT

(71) Applicant: Siemens Energy Global GmbH & Co. KG, Munich (DE)

(72) Inventors: Magnus Hasselqvist, Finspang (SE); Christoph Heinze, Berlin (DE); Michael Ott, Mülheim an der Ruhr (DE); Britta Stöhr, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 271 days.

(21) Appl. No.: 16/343,213

(22) PCT Filed: Oct. 30, 2017

(86) PCT No.: PCT/EP2017/077789
§ 371 (c)(1),
(2) Date: Apr. 18, 2019

(87) PCT Pub. No.: WO2018/083065
PCT Pub. Date: May 11, 2018

(65) Prior Publication Data
US 2019/0249277 A1    Aug. 15, 2019

(30) Foreign Application Priority Data
Nov. 2, 2016   (DE) .................. 10 2016 221 470.5

(51) Int. Cl.
| | | |
|---|---|---|
| *C22C 19/05* | (2006.01) | |
| *B22F 10/20* | (2021.01) | |
| *B33Y 10/00* | (2015.01) | |
| *B33Y 70/00* | (2020.01) | |
| *B33Y 80/00* | (2015.01) | |

(52) U.S. Cl.
CPC ............ *C22C 19/056* (2013.01); *B22F 10/20* (2021.01); *C22C 19/057* (2013.01); *B22F 2301/15* (2013.01); *B33Y 10/00* (2014.12); *B33Y 70/00* (2014.12); *B33Y 80/00* (2014.12)

(58) Field of Classification Search
CPC ..... C22C 19/056; C22C 19/057; B22F 10/20; B22F 2301/15; B33Y 10/00; B33Y 70/00; B33Y 80/00
See application file for complete search history.

(56) References Cited

U.S. PATENT DOCUMENTS

| | | |
|---|---|---|
| 3,832,167 A | 8/1974 | Shaw et al. |
| 4,292,076 A | 9/1981 | Gigliotti et al. |
| 4,388,124 A | 6/1983 | Henry |
| 5,035,958 A | 7/1991 | Jackson et al. |
| 5,780,116 A * | 7/1998 | Sileo .................. C23C 4/02 427/456 |
| 5,783,318 A | 7/1998 | Biondo et al. |
| 6,419,763 B1 | 7/2002 | Konter et al. |
| 2004/0229072 A1 | 11/2004 | Murphy |
| 2005/0271886 A1 | 12/2005 | Cetel |
| 2014/0314618 A1 | 10/2014 | Feng et al. |
| 2016/0167172 A1 | 6/2016 | Goncharov et al. |
| 2017/0209923 A1 | 7/2017 | Giovannetti et al. |

FOREIGN PATENT DOCUMENTS

| | | |
|---|---|---|
| CA | 2349412 A1 | 5/2000 |
| CN | 104120307 A | 10/2014 |
| DE | 2208177 A1 | 10/1972 |
| DE | 102009010026 A1 | 8/2010 |
| EP | 1054072 A1 | 11/2000 |
| EP | 1201778 A2 | 5/2002 |
| EP | 1431405 A1 | 6/2004 |
| EP | 2859979 A1 | 4/2015 |
| JP | S4730527 U | 11/1972 |
| JP | 09272933 A * | 10/1997 |
| JP | H09272933 A | 10/1997 |
| JP | H10502416 A | 3/1998 |
| JP | 2004538358 A | 12/2004 |
| JP | 2005097650 A | 4/2005 |
| JP | 2016502615 A | 1/2016 |
| JP | 2017529453 A | 10/2017 |
| WO | 2014052323 A1 | 4/2014 |
| WO | 2018116810 A1 | 6/2018 |

OTHER PUBLICATIONS

JPH09272933A English translation (Year: 2020).*
JPH09272933A translation (Year: 2021).*
PCT International Search Report and Written Opinion of International Searching Authority dated Feb. 9, 2018 corresponding to PCT International Application No. PCT/EP2017/077789 filed Oct. 30, 2017.

* cited by examiner

*Primary Examiner* — Robert S Jones, Jr.
*Assistant Examiner* — Jiangtian Xu

(57) ABSTRACT

A nickel-based superalloy without titanium and a corresponding powder. A process for producing a component, wherein the alloy or the powder is used, in particular for a process for additive manufacture, especially selective laser sintering or selective laser melting. A component having an alloy or produced from the powder or produced by the process.

11 Claims, No Drawings

SUPERALLOY WITHOUT TITANIUM, POWDER, METHOD AND COMPONENT

CROSS REFERENCE TO RELATED APPLICATIONS

This application is the US National Stage of International Application No. PCT/EP2017/077789 filed Oct. 30, 2017, and claims the benefit thereof. The International Application claims the benefit of German Application No. DE 10 2016 221 470.5 filed Nov. 2, 2016. All of the applications are incorporated by reference herein in their entirety.

FIELD OF INVENTION

The invention relates to a superalloy without titanium, a powder and also a manufacturing process which utilizes the alloy and the powder and also a component.

BACKGROUND OF INVENTION

Alloy 247 is a nickel-based casting alloy which is widely used in the field of high-temperature turbine components. This alloy has a high γ' content and as a result good creep properties in combination with good oxidation resistance. However, in the cast state the alloy tends to form segregations which lead to a significantly different γ/γ' structure being formed in the dendritic regions and the interdendritic regions. A morphology as is present in the dendritic regions is desirable.

The segregations during solidification lead to high concentrations of γ'-forming elements such as titanium (Ti) and tantalum (Ta) accumulating in the interdendritic regions and these locally greatly increase the γ' solvus temperature. This cannot be eliminated even by means of subsequent solution heat treatment since the γ' solvus temperature in the interdendritic regions can be so high that solution heat treatment is no longer possible without incipient melting.

The overall composition of the alloy 247 is designed so that an optimal structure is obtained in the dendritic regions. The coarsened γ' precipitates in the interdendritic regions are accepted as unavoidable.

SUMMARY OF INVENTION

It is therefore an object of the invention to solve the abovementioned problem.

In first attempts to process the alloy 247 by means of additive processes, it was noticed that an optimal γ/γ' microstructure is not obtained even after complete heat treatment (identical to cast material). The reason for this is that a largely homogeneous element distribution is present after the additive application. The segregation effects as occur in the case of cast material do not occur in the case of the additively built up material. However, it is found that the microstructure established in the additively built up material is not optimal. Comparison with the cast material shows that the γ/γ' structure is similar to that in the transition regions (dendritic/interdendritic) in the cast material. It can be concluded from this that excessively high proportions of γ'-formers are present in the overall composition of the alloy-247 alloys utilized at present.

The same chemical composition as is present in the casting material has hitherto been used for additive manufacturing processes. However, owing to the high γ content, this alloy can be welded only with very great difficulty and is therefore difficult to process by means of additive processes.

The object is achieved by an alloy, a powder, a process and a component as claimed.

Further advantageous measures which can be combined with one another in any way in order to achieve further advantages are listed in the dependent claims.

DETAILED DESCRIPTION OF INVENTION

It is proposed that a modified composition of the alloy 247 be used. This material advantageously does not contain any titanium (Ti) except for impurities and also has a reduced proportion of tantalum (Ta) (γ'-former).

Furthermore, the proportion of chromium (Cr) has been increased, so that the oxidation and corrosion resistance is improved further.

Up to 0.03% by weight of yttrium (Y) can optionally be alloyed into the material in order to improve the cyclic oxidation resistance.

The following composition range (in % by weight) is advantageous: Ni: balance, Cr: 9-16%, Co: 9-11.5%, W: 6.5-10.5%, Ta: 1-3%, Al: 4-6%, C: 0.03-0.1%, B: 0.005-0.015%, Hf: 0.3-1.5%, Zr: 0.005-0.015%, Y: 0-0.03%.

Advantages are also obtained for the nickel-based superalloy in the case of the following ranges (in % by weight):
  chromium (Cr): 12%-14%,
  cobalt (Co): 9.5%-11.0%,
  tungsten (W): 7.5%-9.5%,
  tantalum (Ta): 1.5%-2.5%,
  aluminum (Al): 4.5%-5.5%,
  carbon (C): 0.04%-0.08%,
  boron (B): 0.007%-0.01%,
  hafnium (Hf): 0.4%-1.2%,
  zirconium (Zr): 0.007%-0.01%,
  optionally yttrium (Y): 0.01%-0.03%.

Further advantages are obtained for the nickel-based superalloy when using these values (in % by weight):
  chromium (Cr): 12.5%,
  cobalt (Co): 10.5%,
  tungsten (W): 8.5%,
  tantalum (Ta): 2%,
  aluminum (Al): 5%,
  carbon (C): 0.05%,
  boron (B): 0.009%,
  hafnium (Hf): 0.5%,
  zirconium (Zr): 0.009%,
  optionally yttrium (Y):0%-0.03%.

A definitive alloy listing of Ni, Cr, Co, W, Ta, Al, C, B, Hf, Zr and optionally Y is advantageous.

The material proposed here is entirely novel. It combines the following advantages:—improved weldability and is thus better suited for additive processes and also for deposition welding in the course of repairs,—optimized γ' structure by widening of the heat treatment window, as a result of which optimized creep resistance (γ/γ' structure as in the dendritic regions in the cast microstructure should be established after additive buildup and complete heat treatment),—improved economics in additive processes,—economical processability of the alloy 247 by means of additive processes,—improved oxidation resistance.

The powder composed of the alloy can optionally comprise melting point reducers such as gallium (Ga), germanium (Ge), silicon (Si), . . . and/or hard material particles or ceramic particles.

The invention claimed is:

1. A nickel-based superalloy, wherein the alloying elements consist of in % by weight:
   chromium (Cr): 12%-14%,
   cobalt (Co): 9.5%-11.0%,
   tungsten (W): 7.5%-9.5%,
   tantalum (Ta): 1.5%-2.5%,
   aluminum (Al): 4.5%-5.5%,
   carbon (C): 0.04%-0.08%,
   boron (B): 0.007%-0.01%,
   hafnium (Hf): 0.4%-1.2%,
   zirconium (Zr): 0.007%-0.01%; and
   balance nickel (Ni),
   wherein the nickel-based superalloy comprises no titanium (Ti).

2. The nickel-based superalloy of claim 1,
   wherein the alloying elements consist of in % by weight:
   chromium (Cr): 12.5%,
   cobalt (Co): 10.5%,
   tungsten (W): 8.5%,
   tantalum (Ta): 2%,
   aluminum (Al): 5%,
   carbon (C): 0.05%,
   boron (B): 0.009%,
   hafnium (Hf): 0.5%,
   zirconium (Zr): 0.009%; and
   balance nickel (Ni),
   wherein the nickel-based superalloy comprises no titanium (Ti).

3. A powder comprising: at least the nickel-based superalloy as claimed in claim 1.

4. A powder comprising: the nickel-based superalloy consisting of the alloying elements of claim 1.

5. A process for producing a component, comprising: producing the component with the nickel-based superalloy as claimed in claim 1.

6. The process for producing a component of claim 5, wherein additive manufacture, selective laser sintering, or selective laser melting is used.

7. A process for producing a component, comprising: producing the component with the powder as claimed in claim 3.

8. The process for producing a component of claim 6, wherein additive manufacture, selective laser sintering, or selective laser melting is used.

9. A component comprising: the nickel-based superalloy as claimed in claim 1.

10. A component produced from the powder as claimed in claim 3.

11. A component produced by the process as claimed in claim 5.

* * * * *